Oct. 23, 1923.

J. J. LANE ET AL 1,471,742

AUTOMOBILE LOCK

Filed Sept. 22, 1919    2 Sheets-Sheet 1

Inventors: John J. Lane,
Jules H. Groat,
by: Attorney.

Oct. 23, 1923.
J. J. LANE ET AL
1,471,742
AUTOMOBILE LOCK
Filed Sept. 22, 1919
2 Sheets-Sheet 2
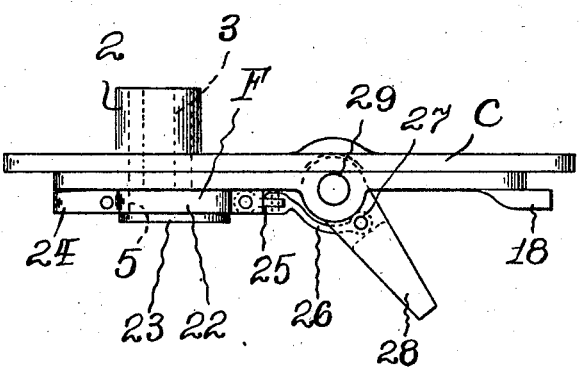
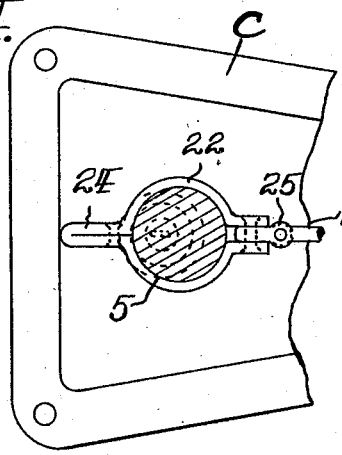
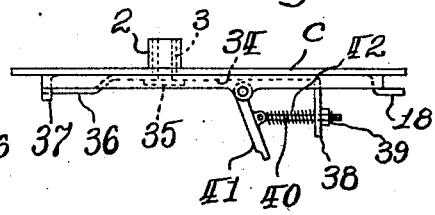
Inventors: John J. Lane, Jules H. Groat,
by: Howard Fisch
Attorney.

Patented Oct. 23, 1923.

1,471,742

UNITED STATES PATENT OFFICE.

JOHN J. LANE AND JULES H. GROAT, OF ST. PAUL, MINNESOTA.

AUTOMOBILE LOCK.

Application filed September 22, 1919. Serial No. 325,426.

*To all whom it may concern:*

Be it known that we, JOHN J. LANE and JULES H. GROAT, citizens of the United States, residing at St. Paul, in the county of Ramsey and State of Minnesota, have invented a new and useful Improvement in Automobile Locks, of which the following is a specification.

Our invention relates to an automobile lock which is particularly adapted to operate in connection with the transmission of an automobile so as to engage and lock the operating parts against rotation and thus lock the automobile so that it cannot be easily stolen.

It is an important feature of our invention to provide a simple and inexpensive locking means, and in the drawings we have illustrated our lock in connection with an ordinary well known transmission, our lock being attached to the transmission cover plate in a suitable manner. The locking mechanism can be varied to suit the particular transmission so as to carry out the principles of our invention.

The invention further provides means for locking the transmission cover plate against removal simultaneous with the locking of the automobile transmission and while the lock is so designed that it will be practically unnoticeable to the ordinary observer, should the lock be discovered by a thief he will find when he comes to try to remove the transmission cover plate that he is unable to do so unless he is able to unlock the lock.

In the drawings forming part of our specification:

Figure 3 illustrates a side elevation of the transmission cover plate showing an alternative form of our locking mechanism.

Figure 4 is a bottom view of the locking mechanism and transmission cover plate illustrated in Figure 3, a portion of the mechanism being broken away and partly illustrated in cross section.

Figure 5 is a side elevation of the transmission cover plate, showing a locking mechanism having similar functions to that illustrated in Figure 1, but of a different form.

Figure 1:
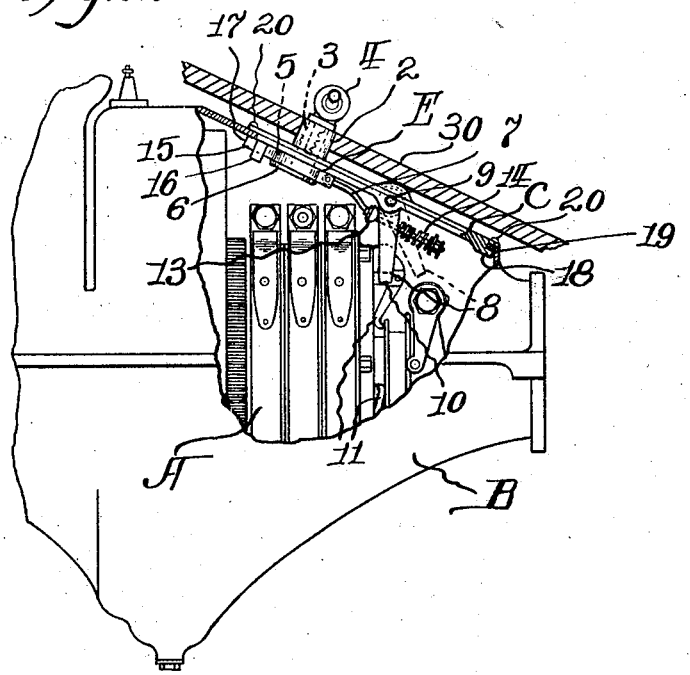
Figure 1 is a side elevation of a well known transmission, a portion of the housing being broken away and partly illustrated in cross section, also illustrating the position of a portion of the floor board above the transmission.
Figure 2:
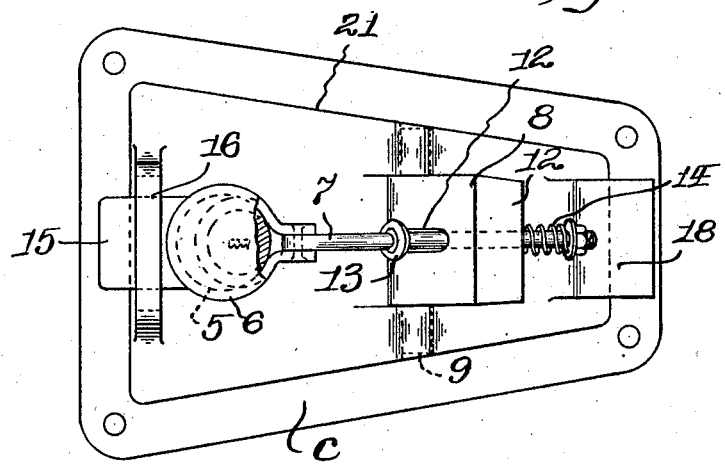
Figure 2 is a bottom view of our locking mechanism and the transmission cover plate to which it is attached.

The drawings illustrate an automobile transmission A, of an ordinary well known construction provided with a transmission housing, B, of any suitable material and to which our transmission cover plate, C, with its locking mechanism, E, is attached. The locking mechanism, E, is quickly and easily attached to the transmission, A, by removing the transmission cover plate and attaching our cover plate, C, which is of similar dimensions and shape as the cover plate used on the transmission, A.

The cover plate, C, is formed with an upwardly projecting cylinder, 2, on its outer surface which is adapted to receive the revolving plug, 3, as is used in an ordinary cylinder lock. When the key 4, is inserted in the plug 3, the plug can be rotated to operate the locking mechanism.

An eccentric disk 5, is rigidly attached in any suitable manner to the plug 3, and is adapted to be rotated with the plug when the key 4, is inserted in the lock. A suitable eccentric strap 6, encircles the eccentric 5, and is adapted to be operated by the same. The eccentric strap 6, is connected by the eccentric rod 7, to the locking dog, 8.

The upper end of the locking dog 8, is pivoted by the pin 9, to the cover C, and the free end 10, of the locking dog is adapted to be brought into or out of engagement with the transmission clutch fingers 11, by the eccentric rod 7, when the eccentric 5, is operated by the key 4, of the locking mechanism E. The free end 10, of the locking dog, 8, is brought into engagement with the clutch fingers 11, or between the same as illustrated in Fig. 1. Thus mechanism E, is in position to prevent the rotation and operation of the transmission mechanism of the automobile in the ordinary manner.

The eccentric rod 7, extends freely through the slot 12, formed in the dog 8, and is provided with a shoulder 13, which engages against one side of the dog 8, while the coil spring 14, is secured in a suitable manner on the free end of the eccentric rod 7, and normally holds the dog A, against the shoulder 13. This construction allows the spring 14, to be compressed if the transmission mechanism stops at a point where the locking dog 8, would come in contact with the outer surface of one of the clutch fingers 11, instead of in position to engage between the fingers, when it is desired to set the mechanism E, in locking position, and should anyone try to steal the car, as soon as the clutch fingers 11 have been rotated a slight distance the spring 14 would force the locking dog 8, between the same, and prevent the rotation of the clutch fingers 11, thereby locking the automobile transmission.

The shoulder 13, serves to force the locking dog 8, out of locking position, as illustrated in dotted outline in Figure 1, when the mechanism E, is unlocked by the key 4.

The eccentric strap 6, of the mechanism E, is attached thereto in any suitable manner by its locking tongue 15, which slides freely through the yoke or guide 16, formed on the lower surface of the cover C, and when the mechanism E, is set in locking position by the key 4, the tongue 15, is set into engagement with the inner surface of the casing or cover B, at 17. At the opposite end of the cover C, from the locking tongue 15, an outwardly projecting lip 18, is formed integral with the cover C, so as to engage the housing B, at 19, to lock this end of the cover C, against free disengagement. The cover C, is attached by means of the screws 20, to the transmission housing B, in the ordinary manner and the lip, 18, together with the locking tongue 15, are adapted to lock the cover C, against disengagement from the housing B, when the mechanism E, is set in locking position, so that the cover C, is simultaneously locked against disengagement from the housing B, when the locking dog 8, is set in locking position.

A shoulder 21, is formed projecting from the inner portion of the cover C, which is approximately of the same dimensions as the opening in the housing B, which the cover C, is adapted to close. Thus it is impossible to slide the cover in any direction when it is in position on housing B, and therefore, the lip 18, and locking tongue 15 will prevent it from being removed even if the screws 20, were disengaged. The extreme simplicity of this construction provides a very desirable locking mechanism, especially for this construction of transmission.

In Figures 3 and 4 an alternative construction of locking mechanism F, is illustrated attached to the cover C. In this construction the rotatable plug 3, is attached to the eccentric disk 5, in the ordinary manner so that when the plug is rotated by the key which releases the same, the eccentric will also be rotated.

An eccentric strap 22, encircles the eccentric 5, and is held in place by the shoulder 23, in the ordinary manner. The eccentric strap 22, is bent to form a projecting portion which forms a locking tongue 24, with similar functions to the locking tongue 15. This cover C, is also formed with the locking lip 18, and by means of the lip 18 and the tongue 24, the cover is locked against removal, simultaneously with the setting of the mechanism F, in locking position.

The eccentric strap 22, is pivotally connected by a suitable link 25, to the connecting or eccentric rod, 26, and one end of the connecting rod 26, is pivotally connected to the locking dog 28, which is of a similar construction as the locking dog 8, of Figure 1. The locking dog 28, is pivoted by means of a pin 29, to the cover C.

Figure 4 illustrates a bottom view of the construction illustrated in Figure 3 with the shoulder 23, removed, a portion of the cover being broken away.

The mechanism F, is operated by a suitable key similar to the operation of the mechanism E, but in this construction no resilient means is provided between the eccentric and the locking dog, and it is necessary that the locking dog 28, enter between the rotatable elements of the transmission, such as A, or any other suitable construction, as the mechanism F, is being set in locking position.

It is obvious that the locking dogs 8 or 28, can be operated to engage the gear teeth of any automobile transmission when the locking mechanism, such as E or F, is suitable designed. Either of the mechanisms illustrated in describing our invention are of very simple and inexpensive construction, and the cylinder 2, of the lock projects through the foot board 30, as illustrated in Figure 1. In this manner the lock is practically invisible to the ordinary observer and cannot be easily detected.

The construction illustrated in Figure 5 is similar in function to that illustrated in Figure 1 but is simpler, having a single piece locking bar 34, which extends along the inner surface of the plate C and is engaged by the head 35 to hold the same to the cylinder or revolving plug 3 of the cylinder 2 and the bar 34 is formed with a forward engaging end 36, which extends through the loop 37 formed on the cover plate C. The engaging end 36 is similar in function to the locking tongues 15 and 24.

The rear end of the bar 34 is bent downward to extend away from the inner surface of the plate C, forming an engaging end 38, through which the bolt 40 freely passes. The bolt 40 is pivotally connected to the locking dog 41, which is similar to the locking dogs 8 and 28. A coil spring 42 is positioned about the rod 40, between the end 38 and the pivotal engagement of the rod 40 with the locking dog 41. An adjusting nut 39 is attached to the outer free end of the rod 40, against which the end 38 is adapted to engage. The spring 42 allows the locking mechanism to be operated to set it in locking position even if the dog 41 is obstructed against moving into locking position by any of the parts of the transmission, but as soon as the parts of the transmission forming the obstruction are moved, the locking dog 41 will slip into place between the rotating parts, being forced in by the spring 42, and will thus lock the transmission against operation, thereby locking the car or vehicle to which the locking mechanism is attached. The plate C, illustrated in Figure 5, is also formed with a locking tongue on one end 18, which is formed integral with the plate. When the locking mechanism illustrated in Figure 5 is set in locking position, the forward end or tongue 36 of the bar 34 and the tongue 18 will hold the plate C against removal from the transmission housing.

In accordance with the patent statutes we have described the principles of operation of our invention, together with the apparatus which we now consider to represent the best embodiment thereof, but we desire to have it understood that the construction shown is only illustrative and that the invention can be carried out by other means and applied to uses other than those above set forth within the scope of the following claims:

1. A transmission lock in combination with a transmission cover plate, an eccentric, a cylinder lock connected to operate said eccentric, a locking dog, means connecting said locking dog with said eccentric to cause said dog to be operated by said eccentric when said cylinder lock is operated to move the free end of said locking dog into or out of engagement with the clutch or gear set of said transmission.

2. An automobile lock in combination with a transmission, including a transmission cover plate, key locking means held in said cover plate, a locking dog adapted to be moved into the path of the clutch or gear set of said transmission and eccentric means connected with said key locking means, said locking means being adapted to operate said dog into or out of locking position.

3. A lock in combination with an automobile transmission, including a transmisison housing, a cylinder key lock secured to said cover, a locking dog pivoted to said cover, said dog adapted to engage the clutch or gear set of the transmission, means connecting said key lock with said locking dog to set said dog in locking or unlocking position when said key lock is operated, and means connected with said key lock adapted to lock said cover against disengagement from said housing when said locking dog is in locking position.

4. A lock in combination with an automobile transmission, a housing for said transmission, a removable cover plate adapted to be connected with said housing, a locking dog pivoted to said cover plate, key locking means adapted to operate said dog and resilient means adapted to force said dog into locking position with the clutch or gear set of the transmission to hold the same against movement.

5. An automobile lock in combination with a transmission, having a gear set or clutch, a cylinder lock, a locking dog, means connecting said locking dog with said cylinder lock to cause the free end of said dog to be swung into the path of the gear set or clutch of said transmission when said transmission is in operation to propel a vehicle and resilient means interposed in said connecting means to allow said locking mechanism to be set in locking position when said locking dog is held out of locking position by an obstructing part in said transmission, said resilient means forcing said dog into locking position when the obstructing part in said transmission is moved out of the path of said locking dog.

6. A lock in combination with an auto transmission, including a housing for said transmission, a cover plate adapted to be removably held to said transmission, a cylinder lock held by said cover plate, an eccentric connected to said cylinder lock and adapted to be operated thereby, an eccentric strap, a locking dog having one end pivoted in said cover plate, means connecting the free end of said dog with said eccentric strap, whereby said dog is operated when said cylinder lock is operated to set the same into locking position, the free end of said dog being adapted to engage said transmission to lock said transmission against operation to propel a car.

7. A lock in combination with an auto transmission, including a removable cover plate for the transmission, housing, a key operated locking mechanism held by said plate, a locking dog pivoted on said plate, the free end of said dog being adapted to be moved into the path of an operating part of said transmission to lock the same, means connecting said dog with said key lock to operate the same, and means projecting from said connecting means adapted to lock said plate to the transmission housing against removal therefrom when said locking dog is in locking position.

8. A lock in combination with an auto transmission, including a removable cover for the transmission housing, a key operated locking mechanism secured to said cover, a locking dog pivoted to said cover, means connecting said dog with said key operated locking mechanism, whereby when said key is operated said dog can be brought in the path of said transmission to block the same and thereby lock said transmission and vehicle to which it is attached.

9. A lock in combination with an auto transmission including a removable cover plate for the transmission, a cylinder lock projecting from the outside surface of said cover plate, a locking element projecting from the inside surface of said cover plate and means for connecting said locking means so as to operate both simultaneously, said locking means projecting from the inner portion of said plate being adapted to engage said transmission to lock the same against rotation.

JOHN J. LANE.
JULES H. GROAT.